United States Patent
Pierre et al.

(10) Patent No.: US 6,734,305 B2
(45) Date of Patent: May 11, 2004

(54) ELECTROCHROMIC OR PHOTOELECTROCHROMIC DEVICE

(75) Inventors: Bonhôte Pierre, Neuchâtel (CH); Walder Lorenz, Osnabrück (DE); Grätzel Michael, Saint-Sulpice (CH)

(73) Assignee: Ecole Polytechnique Federale de Lausanne, Lausanne (CH)

( * ) Notice: Subject to any disclaimer, the term of this patent is extended or adjusted under 35 U.S.C. 154(b) by 74 days.

(21) Appl. No.: 10/165,318

(22) Filed: Jun. 7, 2002

(65) Prior Publication Data

US 2002/0181068 A1 Dec. 5, 2002

Related U.S. Application Data

(62) Division of application No. 09/549,443, filed on Apr. 14, 2000, now Pat. No. 6,426,827, which is a continuation of application No. 09/142,733, filed as application No. PCT/CH97/00104 on Mar. 13, 1997, now Pat. No. 6,067,184.

(30) Foreign Application Priority Data

Mar. 15, 1996 (CH) ................................ 712/96

(51) Int. Cl.[7] .......................... C07D 241/46; G02B 5/23
(52) U.S. Cl. ...................... 544/347; 546/257; 252/586; 359/265
(58) Field of Search .............................. 359/265–275; 252/583, 586; 544/347; 546/257

(56) References Cited

U.S. PATENT DOCUMENTS

| | | | |
|---|---|---|---|
| 4,118,387 A | * 10/1978 | Fuchs et al. | 546/98 |
| 4,365,010 A | 12/1982 | Bard et al. | 359/265 |
| 4,376,569 A | * 3/1983 | Barltrop et al. | 359/270 |
| 4,439,302 A | * 3/1984 | Wrighton et al. | 204/290.11 |
| 4,473,695 A | * 9/1984 | Wrighton et al. | 546/266 |
| 4,599,614 A | 7/1986 | DeBerry et al. | 345/105 |
| 4,735,879 A | 4/1988 | Hotta et al. | 430/19 |

(List continued on next page.)

FOREIGN PATENT DOCUMENTS

WO    WO 95/30495    11/1995

OTHER PUBLICATIONS

*New Complimentary Electrochromic Display Utilizing Polymeric YbPc2 and Prussian Blue Films.* By Naoya Kashiwazaki, Tokyo Denki University, Saitama, Japan, Mar. 4, 1991.

*Towards Large–Area Photovoltaic Nanocells: Experiences learned from Smart Window Technology.* By Carl M. Lampert, Lawrence Berkeley Laboratory, University of California, Berkeley, California, Sep. 1, 1993.

(List continued on next page.)

*Primary Examiner*—Evelyn Lester
(74) *Attorney, Agent, or Firm*—Clifford W Browning; Woodard, Emhardt, Moriarty, McNett & Henry LLP

(57) ABSTRACT

An electrochromic or photoelectrochromic device possessing the property of changing color under the effect of an electric voltage and/or of a variation in the intensity of a light radiation, this device comprising at least one cathode and one anode, at least one of these electrodes being constituted at least in part of a transparent or translucent substrate bearing an electrically conductive coating, and an electrolyte arranged between these electrodes, and an electric circuit connecting said cathode and anode, characterized in that at least one of these electrodes carries a coating constituted of at least one nanocrystalline layer of at least one semiconductive material, having a roughness factor equal to at least 20, and a monolayer of electrically active molecules or of an electrically active polymer, said monolayer being absorbed on the surface of this coating, and in that the device contains at least one auxiliary electrically active compound, possibly dissolved in the electrolyte, having the property of being capable of being oxidized or reduced in a reversible manner.

8 Claims, 11 Drawing Sheets

U.S. PATENT DOCUMENTS

Figure 1:
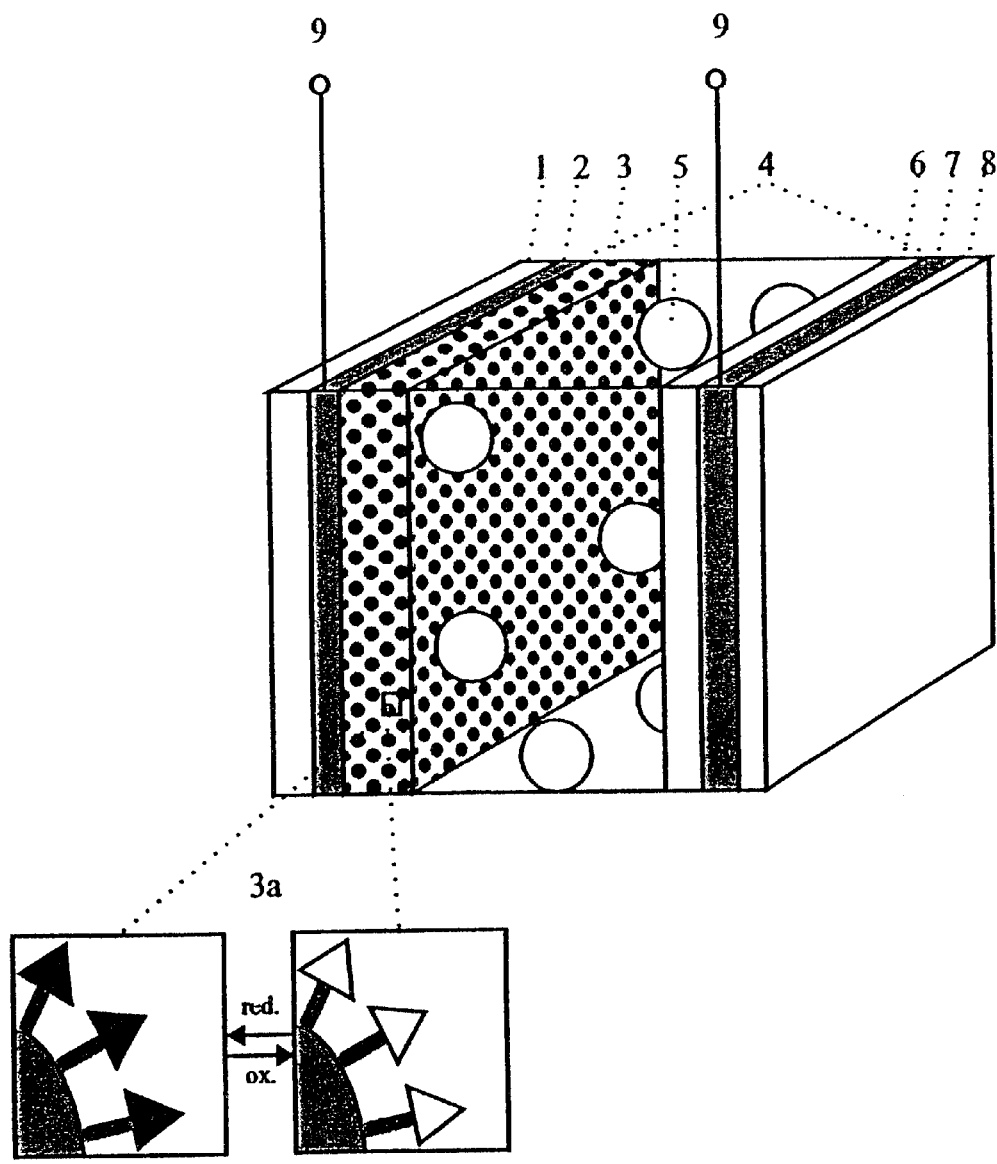

| | | | | |
|---|---|---|---|---|
| 4,867,541 A | * | 9/1989 | Hotomi | 359/265 |
| 4,902,108 A | * | 2/1990 | Byker | 359/265 |
| 5,034,192 A | * | 7/1991 | Wrighton et al. | 422/82.02 |
| 5,169,953 A | * | 12/1992 | Mizuguchi et al. | 544/144 |
| 5,294,376 A | * | 3/1994 | Byker | 252/600 |
| 5,298,063 A | * | 3/1994 | Mizuguchi et al. | 106/31.64 |
| 5,336,448 A | * | 8/1994 | Byker | 252/583 |
| 5,604,626 A | | 2/1997 | Teowee et al. | 359/265 |
| 5,708,123 A | * | 1/1998 | Johannsen et al. | 528/229 |
| 5,724,187 A | | 3/1998 | Varaprasad et al. | 359/265 |
| 5,818,636 A | * | 10/1998 | Leventis et al. | 359/273 |
| 5,864,419 A | * | 1/1999 | Lynam | 359/265 |
| 6,067,184 A | | 5/2000 | Bonhote et al. | 359/265 |
| 6,118,572 A | | 9/2000 | Kostecki et al. | 359/265 |
| 6,426,827 B1 | * | 7/2002 | Bonhote et al. | 359/265 |

OTHER PUBLICATIONS

Abstract No. 848 "Nanocrystalline TiO2 Electrodes Modified by Redox Active Organic Monolayers" by Pierre Bonhote et al., *Extended Abstracts*, vol. 94–2, Oct. 8–13, 1995, pp. 1345–1346.

*Nanostructured TiO2 Semiconductor Electrodes Modified with Surface Attached Viologens: Applications for Displays and Smart Windows*. By Anders Hagfeldt et al., Institut de Chimie Physique, Lausanne, Switzerland, SPIE, vol. 2531, 1995.

* cited by examiner coloration bleaching coloration bleaching (1)
2 Br⁻

(2)
4 Br⁻

(3)
4 Br⁻

(4)
2 Cl⁻

(5)
2 Cl⁻

(6)
2 Cl⁻

(7)

(8)

(9)

(10)

ELECTROCHROMIC OR PHOTOELECTROCHROMIC DEVICE

This application is a divisional of prior application No. 09/549,443, now U.S. Pat. No. 6,426,827, filed Apr. 14, 2000 which is a continuation of prior pending application No. 09/142,733, now U.S. Pat. No. 6,067,184 filed Oct. 13, 1998, which is a 371 of PCT/CH97/00109 filed Mar. 13, 1997.

The present invention relates to an electrochromic or photoelectrochromic device, particularly suitable for reversible storage and display of data and for the control of light transmission, making use of one or two electrodes made of semiconductor having high specific surface area.

PREAMBLE

In order to prepare an electrochromic device in which the changing of visible light absorption is greater than 90% (for example from 5 to 95%), and which uses molecules as electrochromic units, it is necessary for the surfaces to have densities reaching the value of $\Gamma > 5 \times 10^{-8}$ mol/cm$^2$ if the extinction coefficient of these molecules varies from $\Delta\epsilon = 20'000$ when changing oxidation state. Up to now, this requirement has been met in the following manner when preparing electrochromic devices:

- the electrochromic compound is present in solution contacting the electrode. The requirement is fulfilled with a 0.25 M concentration and a layer thickness of the solution of 2 $\mu$m;
- the electrochromic compound is electrochemically precipitated in a thin layer on an electrode;
- the electrochromic compound is polymerised or incorporated into a film of polymer or composite material on the surface.

A description is provided hereunder of a new type of electrochromic and photoelectrochromic devices, which, in order to attain the performance characteristics indicated earlier, make use of electrodes made of nanocrystalline semiconductor having very high specific surface area on the surface from which electrodes the electrochromic molecules are adsorbed. These devices are rapid, with switching times of less than 3 s for an absorption change of at least 90%, and allowing for brilliant colours to be obtained.

DESCRIPTION OF THE INVENTION

The invention relates to electrochemical systems comprising at least two electrodes, each of which may be transparent or opaque, and at least one of which changes colour depending on:

I. the voltage applied between the two electrodes by a current-voltage source;
II. the intensity of the light to which the system is exposed;
III. the combined influence of I and II.

Furthermore, the colour change engendered by the light may be
A. local: only the lit location changes colour;
B. global: the entire system changes colour, irrespective of the location of the lighting.

Furthermore, the colour change engendered by the external voltage may be:
a. global: the entire system changes colour;
b. local: only the electrically addressed location changes colour (structured surface of the electrode).

This results in the following applications:
I-a: reversible electrochromic systems for the control of light transmission, governed by an external voltage-current source;
I-b: electrochromic systems for the reversible data display, governed by an external voltage-current source;
III-A: reversible photoelectrochromic systems for the optical writing and reversible data storage, controlled by a light beam (writing) and by an external voltage-current source (storage and deletion);
II-B: systems (filters, glazing), of which the transmission adapts automatically to the intensity of the light received.

All these colour changes, easy to observe with the naked eye except in the case of III-A when data storage is on micrometric and sub-micrometric scale, correspond to chemical reactions which are well defined on the molecular level, namely oxidations or reductions of an electrochromic compound, usually grafted onto the whole of the surface of an electrode made of nanocrystalline semiconductor accessible to such molecules. Such an electrode is prepared by sol-gel process such as the one described in detail by Stalder and Augustynski in *J. Electrochem. Soc.* 1979, 126, 2007, while maintaining the relative humidity of the ambient air at a value of between 50 and 80%, without a variation of more than 5%, during the hydrolysis of the metal alcoholate of which metal the oxide is being prepared. The thickness of the nanocrystalline layer is between 0.1 and 10 $\mu$m or more, leading to a roughness factor of between about 10 and 1000, for example 700, meaning that the electrode surface area which is accessible to molecules having a typical diameter of 1 nm is 10 to 1000 times the value of the projected layer surface; e.g. 700 times. The result of this is that any change in the optical properties of a layer of molecules adsorbed on the surface of the semiconductor will engender macroscopic effects amplified by the roughness factor. Accordingly, the light absorption by a monolayer of coloured molecules will be stronger by a factor equal to the roughness factor on a nanocrystalline electrode than on a flat surface.

Semiconductors which are particularly suitable for the preparation of the nanocrystalline electrodes must possess a large band gap. They may be chosen from among the oxides of the elements from Group IV of the periodic system, e.g. titanium, zirconium, or hafnium, from Group V, e.g. vanadium, niobium, or tantalum, from Group VI, e.g. chromium, molybdenum, or tungsten, or from other groups, e.g. silver, zinc, strontium, iron, or nickel. They may equally be of the perovskite type, such as SrTiO$_3$ or CaTiO$_3$.

In particular, the invention relates to an electrochromic or photoelectrochromic device possessing the property of changing colour under the effect of an electric voltage and/or of a variation in the intensity of a light radiation, this device comprising at least one cathode and one anode, at least one of these electrodes being constituted at least in part of a transparent or translucent substrate bearing an electrically conductive coating, and an electrolyte arranged between these electrodes, and an electric circuit connecting said cathode and anode, this device being characterised in that at least one of these electrodes carries a coating constituted of at least one nanocrystalline layer of at least one semiconductive material, having a roughness factor equal to at least 20, and a monolayer of electrically active molecules or of an electrically active polymer, said monolayer being adsorbed on the surface of this coating, and in that the device contains at least one auxiliary electrically active compound, possibly dissolved in the electrolyte, having the property of being capable of being oxidised or reduced in a reversible manner.

It is in particular possible to envisage embodiments which present one or more of the following specific features:

a. the semiconductor is a titanium-, zirconium-, hafnium-, vanadium-, niobium-, tantalum-, molybdenum-, tungsten-, zinc-, strontium-, iron-, nickel-, silver-oxide or a perovskite of the said metals;

b. the electrical circuit comprises a current-voltage source;

c. the device comprises a small auxiliary electrode in addition to the anode and the cathode;

It is in particular also possible to achieve a number of variants of the electrochromic device according to the invention, each of these variants presenting special features according to one of the following points:

1. variant in which the cathode carries an adsorbed monolayer of at least one type of electrochromophoric molecules, which molecules comprise at least one adsorbable attachment group, possibly a polymerisable or condensible group, and at least one type n electrochromophoric group of which the property is to be colourless in the oxidised state and coloured in the reduced state, the auxiliary electroactive compound being fixed at the anode in the form of an electroactive coating, the electrolytic solution between the electrodes containing at least one electrochemically inert salt in solution in a solvent;

2. variant according to point 1, in which the electrochromophoric molecules comprise, as the electrochromophoric group, N,N'-dialkylbipyridinium or the diimide derivative of naphthalene-1,4,5,8-tetracarboxylic acid;

3. variant according to point 1, in which the electrochromophoric molecules comprise, as the attachment group, the carboxylate, salicylate, catecholate or phosphonate group, and, if applicable, as the polymerisable group, the vinyl or pyrrole group, or, as the condensible group, the alcohol or amine group;

4. variant according to point 1, in which the cathode and anode are transparent;

5. variant according to point 1, in which a reflective screen is placed behind the cathode and the system is therefore opaque;

6. variant according to point 5, in which the reflective screen is constituted of a microcrystalline semiconductor layer, said semiconductor layer being as indicated in point a above, deposited on the cathode face located inside the system;

7. variant according to point 6, in which the anode is a metal plate;

8. variant according to point 7, in which the said metal is zinc;

9. variant according to point 1, in which the said electroactive coating is constituted of a dense electrochemically deposited layer;

10. variant according to point 9, in which this dense layer is reduced Prussian blue ("Prussian white", polyferrocyanide iron(II));

11. variant according to point 9, in which this dense layer is an electroactive organic polymer;

12. variant according to point 9, in which this dense layer is a composite material comprising an electroactive material;

13. variant according to point 1, in which the electroactive coating is constituted of a nanocrystalline semiconductor layer, of which the roughness factor is greater than 20, on the surface of which is adsorbed a monolayer of electroactive molecules or an electroactive polymer;

14. variant according to point 13, in which the electroactive molecules are electrochromophoric molecule comprising an adsorbable attachment group, possibly a polymerisable or condensible group, and a type p electrochromophoric group of which the property is to be colourless in the reduced state and coloured in the oxidised state;

15. variant according to point 14, in which the said electrochromophoric molecules comprise attachment groups and polymerisable group according to point 3;

16. variant according to point 7, in which the electrolytic solution likewise contains a metal salt of which metal the anode is constituted;

17. variant according to point 1, in which the said solvent is an electrochemically inert liquid salt;

18. variant according to point 17, in which the said liquid salt is of 1-ethyl-3 methylimidazolium- or 1-propyl-2, 3-dimethylimidazolium trifluoromethane-sulfonate or -bis(trifluoromethylsulfonyl)amide;

19. variant according to point 1, in which the said solvent is acetonitrile, butyronitrile, glutaronitrile, methoxypropionitrile, dimethylsulfoxide, sulfolane, dimethylformamide, dimethylacetamide, N-methyl oxazolidinone, dimethyl-tetrahydro-pyrimidinone (DMPU);

20. variant according to point 1, in which the said electrochemically inert salt or salts are selected from among tetraalkylammonium-, 1,3-dialkylimidazolium- or lithium hexafluorophosphate, -trifluoromethanesulfonate, -bis(trifluoromethylsulfonyl)amide, or -perchlorate.

Likewise, it is possible to achieve in particular a number of variants of the photoelectrochromic device according to the invention, each of these variants presenting special features according to one of the following points:

21. variant in which the coloration of the device adapts automatically to the intensity of the light;

22. variant according to point 21, in which the anode carries a nanocrystalline semiconductor layer, said semiconductor being in accordance with point a above, of which the roughness factor is greater than 20, on the surface of which semiconductor a monolayer of a sensitising agent is adsorbed, said sensitising agent comprising a chromophoric group, an adsorbable attachment group, and possibly a polymerisable or condensible group;

23. variant according to point 21, in which the anode carries a nanocrystalline semiconductor layer, said semiconductor being in accordance with point a above, of which the roughness factor is greater than 20, on the surface of which semiconductor a monolayer of electrochromophoric molecules is adsorbed, said molecules comprising an adsorbable attachment group, an type p electrochromophoric group of which the property is to be colourless in the reduced state and coloured in the oxidised state, and possibly a polymerisable or condensible group;

24. variant according to point 21, in which the anode bears a nanocrystalline semiconductor layer, said semiconductor being in accordance with point a above, of which the roughness factor is greater than 20, lacking in adsorbed molecules;

25. variant according to point 22, in which the said sensitising agent comprises a type p electrochromophoric group linked to the chromophore of which the property is to be colourless in the reduced state and coloured in the oxidised state;

26. variant according to point 22, in which the said sensitising agent and the said electrochromophoric molecules are co-adsorbed on the anode, in the proportions of 1 to 1, of 1 to 2, or of 1 to 5 or more;
27. variant according to point 21, in which the cathode carries a nanocrystalline semiconductor layer, said semiconductor being in accordance with point a above, of which the roughness factor is greater than 20, on the surface of which semiconductor is adsorbed a monolayer of at least one type of electrochromophoric molecules, which comprise at least one adsorbable attachment group, at least one type n electrochromophoric group of which the property is to be colourless in the oxidised state and coloured in the reduced state, and possibly a polymerisable or condensible group;
28. variant according to point 21, in which the cathode does not carry any nanocrystalline semiconductor layer;
29. variant according to point 21, in which the said electroactive auxiliary compound is an electrochemically active salt, capable of transporting electrons between cathode and anode, dissolved in the said solution;
30. variant according to point 21, in which the said electroactive auxiliary compound is a type p electrochromophoric group linked to the chromophore according to point 25, and in which the said solution only contains electrochemically inactive salts;
31. variant according to point 29, in which the said electrochemically active salt is an type p or type n electrochromophore in solution;
32. variant according to points 22, 23, and 27, in which the said electrochromophoric molecules comprise attachment groups and polymerisable groups according to point 3;
33. variant according to point 21, adapting favourably to visible light, in which the cathode is made in accordance with point 27 and in which the anode is made in accordance with point 22;
34. variant according to point 33, adapting favourably to visible light, made in accordance with point 29;
35. variant according to point 33, adapting favourably to visible light, made in accordance with point 31, in which the said electrochromophore in solution is of type p;
36. variant according to point 21, adapting favourably to visible light, in which the cathode is made in accordance with point 27, and in which the said solution is made in accordance with point 29;
37. variant according to point 36, adapting favourably to visible light, in which the anode is made in accordance with point 25;
38. variant according to point 36, adapting favourably to visible light, in which the anode is made in accordance with point 26;
39. variant according to point 21, adapting favourably to ultra-violet, in which the cathode is made in accordance with point 27, in which the anode is made in accordance with point 23, and in which the said solution is made in accordance with point 29;
40. variant according to point 21, adapting favourably to ultra-violet, in which the cathode is made in accordance with point 27, and in which the said solution is made in accordance with point 29;
41. variant according to point 21, adapting favourably to ultra-violet, in which the cathode is made in accordance with point 28, in which the anode is made in accordance with point 23 above, and in which the said electrochromophore in solution is of type p;
42. variant according to point 21, adapting favourably to ultra-violet, in which the cathode is made in accordance with point 28 and in which the solution is made in accordance with point 31 in which the said electrochromophore in solution is of type p;
43. variant according to point 21, which can be used favourably for reversible data storage, in which the cathode is made in accordance with point 27, and in which the said solution is made in accordance with point 30;
44. variant according to point 21, which can be used favourably for reversible data storage, in which the said solution is made in accordance with point 30 and in which a reflective screen is placed behind the anode.
45. variant according to point 44, in which the reflective screen is made of a microcrystalline semiconductor layer, said semiconductor being in accordance with point a above, deposited in the anode face located inside the system;
46. variant according to point 21, which can be used favourably for reversible data storage, in which the said solution is made in accordance with point 30 and in which the cathode is made of a dense layer of electroactive material, capable to be reversibly reduced, said dense layer being deposited on a layer of conductive plastic or glass;
47. variant according to point 46, which can be used favourably for reversible data storage, in which this dense layer is an electroactive organic polymer or a composite material comprising an electroactive material;
48. variant according to points 43 to 47, which can be used favourably for reversible data storage reacting to visible light, in which the anode is made in accordance with point 22;
49. variant according to points 43 to 47, which can be used favourably for data storage reacting to visible light, in which the anode is made in accordance with point 25;
50. variant according to points 43 to 47, which can be used favourably for data storage reacting to visible light, in which the anode is made in accordance with point 26;
51. variant according to points 43 to 47, which can be used favourably for data storage reacting to ultraviolet, in which the anode is made in accordance with point 23;
52. variant according to point 21, in which the said solvent is an electrochemically inert liquid salt, in accordance with point 18, or another liquid, in accordance with point 19;
53. variant according to point 21, in which one of the electrolytes, electrochemically inactive, is selected in accordance with point 20.

Figure 11:
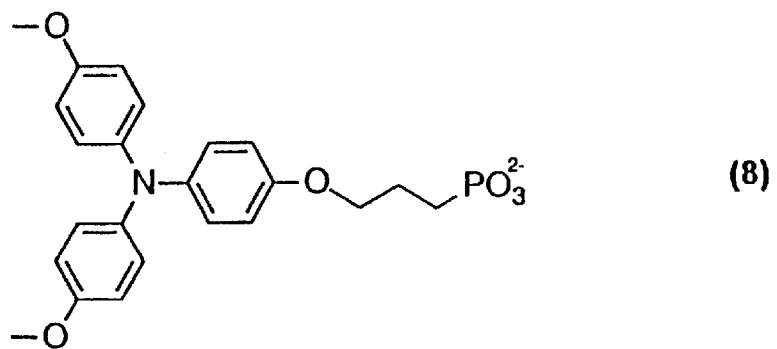
Figure 12:
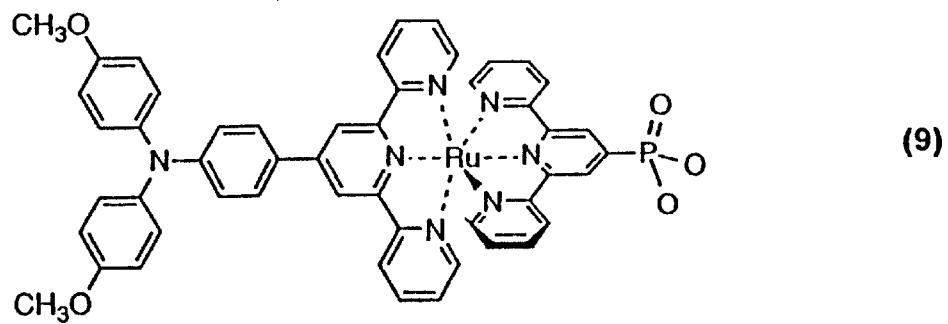
Figure 12:
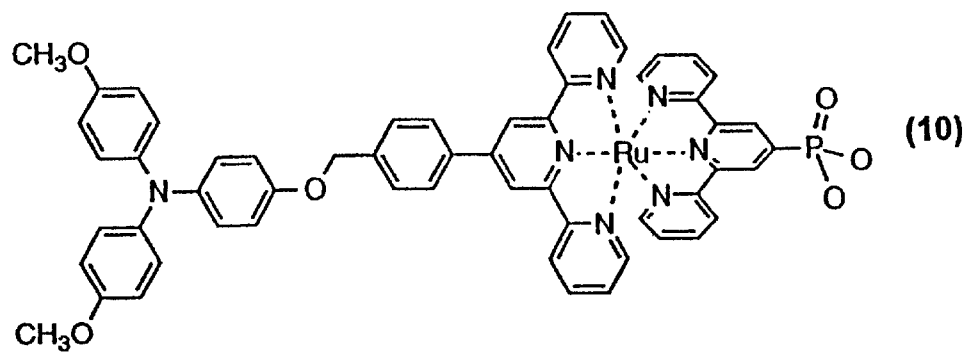

The invention likewise relates to electrochromophoric compounds and sensitising agents, in particular in accordance with the following points:

54. type n electrochromophoric compound according to point 1 formed of one or more viologen groups (4,4'- dialkyl-bipyridinium) linked by one or more alkyl chains which may include one or more phenylene groups and terminated by a phosphonate, salicylate, or catecholate group;

55. type n electrochromophoric compound according to point 54 further comprising a pyrrole, thiophene, vinyl, alcohol, or amine group;

56. type n electrochromophoric compound according to point 1 formed of one or more diimide of naphthalene-1,4,5,8-tetracarboxylic acid groups linked by one or more alkyl chains which may include one or more phenylene groups and terminated by a phosphonate, salicylate, or catecholate group;

57. type n electrochromophoric compound according to point 56 further comprising a pyrrole, thiophene, vinyl, alcohol, or amine group;

58. type n electrochromophoric compound according to points 54 to 57 such as those represented in the structures below;

59. type p electrochromophoric compound according to point 14, formed of one or more triarylamine groups linked by one or more alkyl chains which may include one or more phenylene groups and terminated by a phosphonate, salicylate, or catecholate group;

60. type p electrochromophoric compound according to point 59 further comprising a pyrrole, thiophene, vinyl, alcohol, or amine group;

61. type p electrochromophoric compound according to points 59 and 60 such as those represented by the molecule (8) of FIG. 11;

62. sensitising agent compound to which are linked one or more type p electrochromophoric groups according to point 25 and of which the sensitising agent is a ruthenium complex comprising polypyridine ligands of which at least one possesses one or more phosphonate, carboxylate, salicylate, or catecholate groups and at least one or more triarylamine groups;

63. sensitising agent compound to which are linked one or more type p electrochromophoric groups according to point 62 further comprising a pyrrole, thiophene, vinyl, alcohol, or amine group;

64. sensitising agent compound to which are linked one or more type p electrochromophoric groups according to points 62 and 63 such as those represented by the molecules (9) and (10) of FIG. 12.

DESCRIPTION OF EXAMPLES

Figure 2:
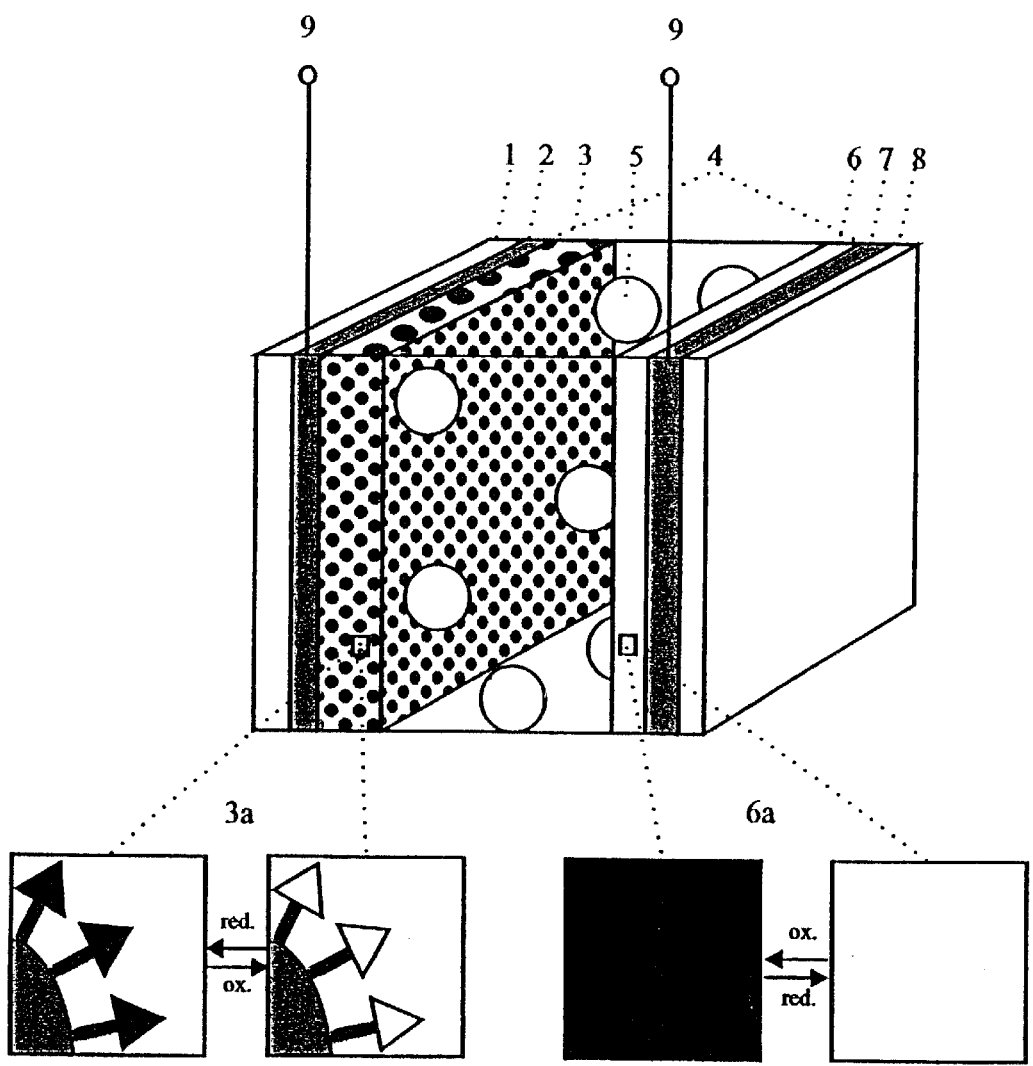
Figure 3:
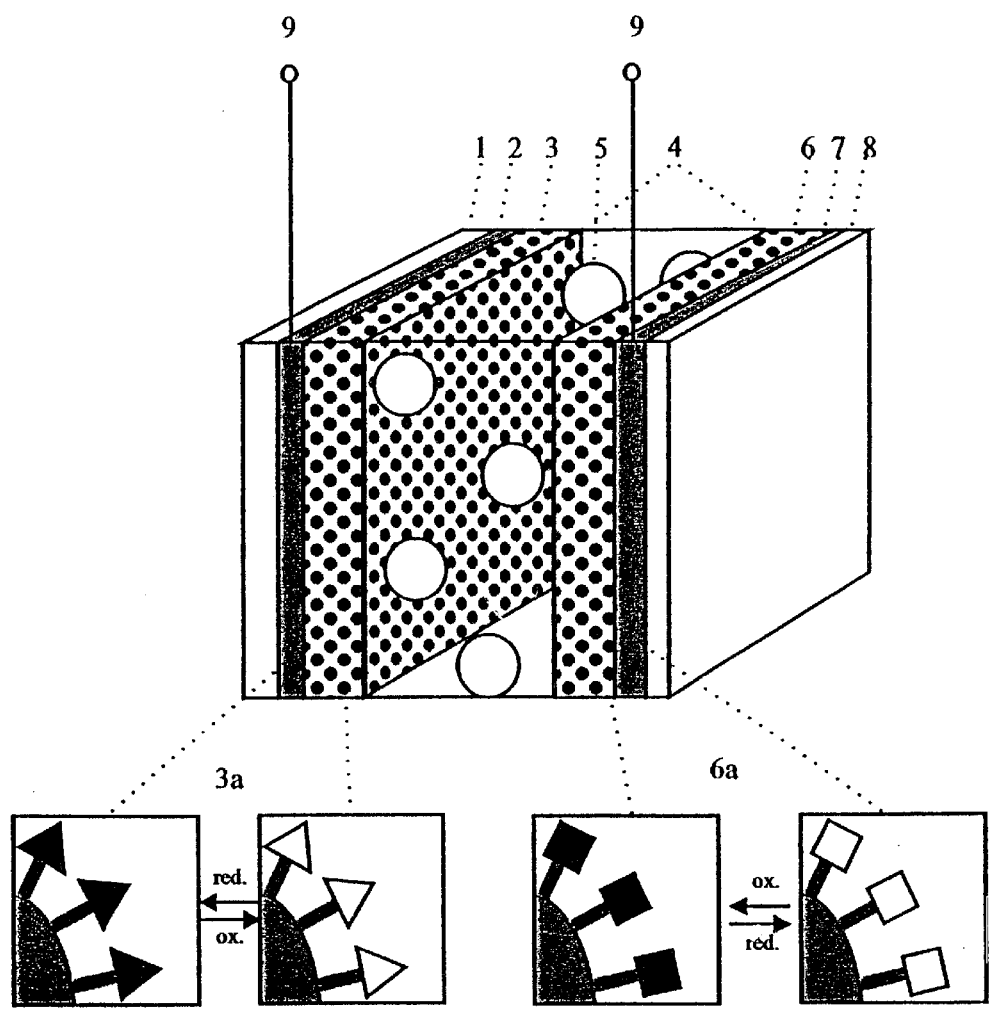
Figure 4:
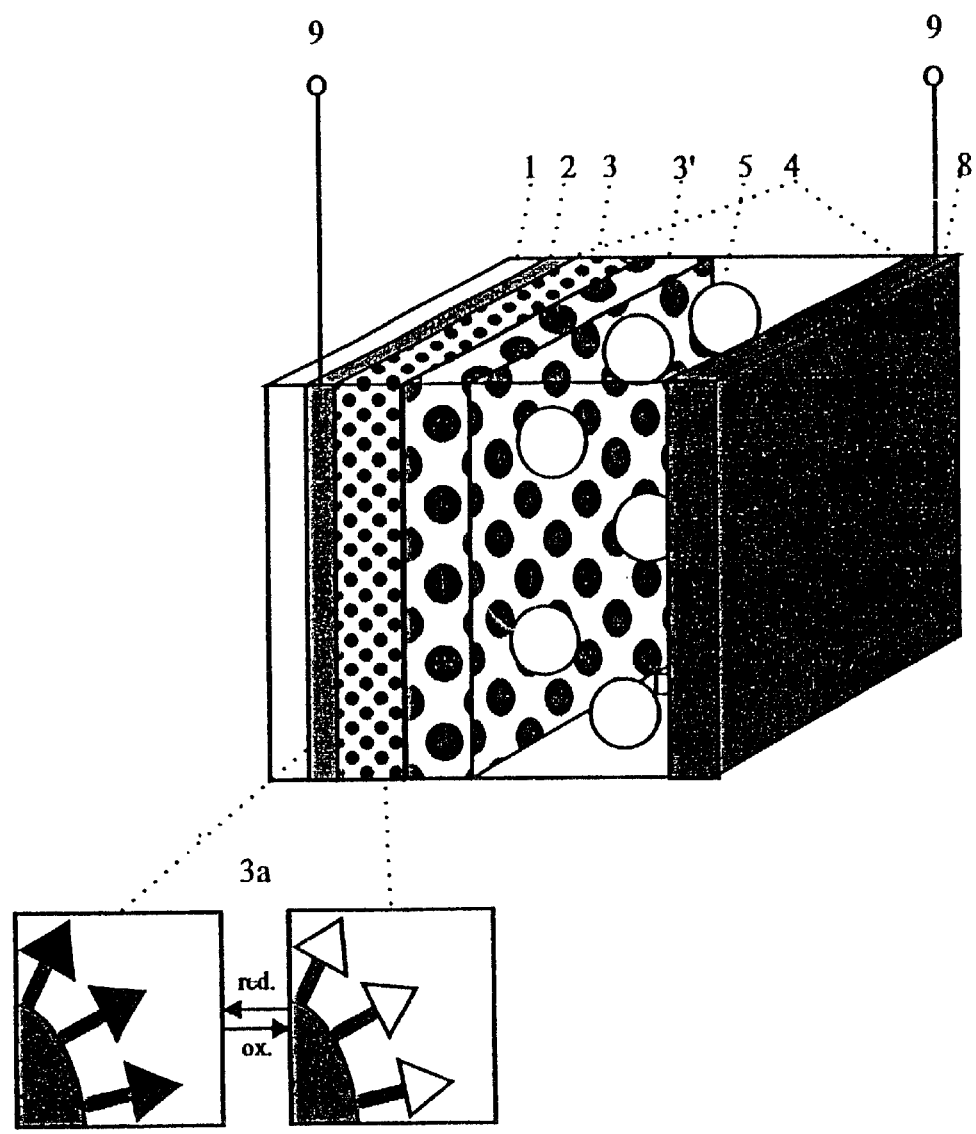
Figure 5:
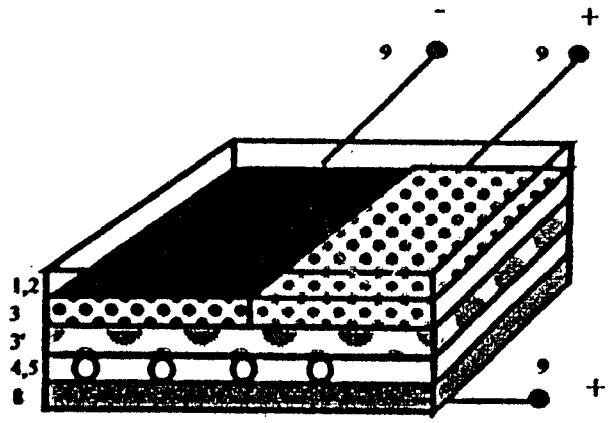
Figure 6A:
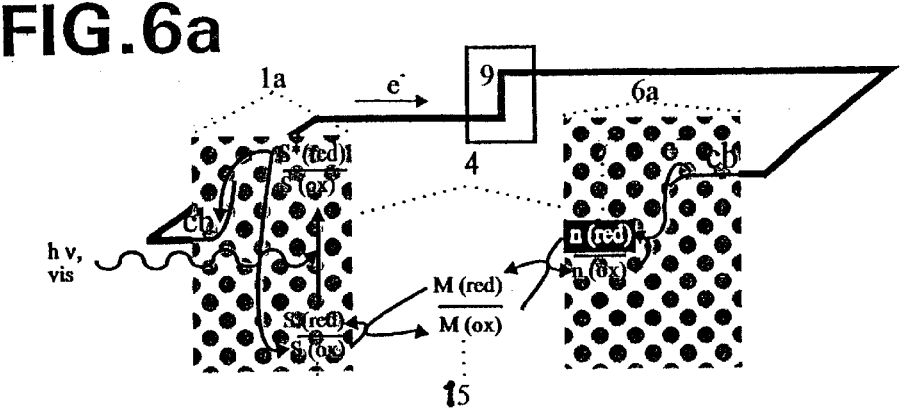
Figure 6B:
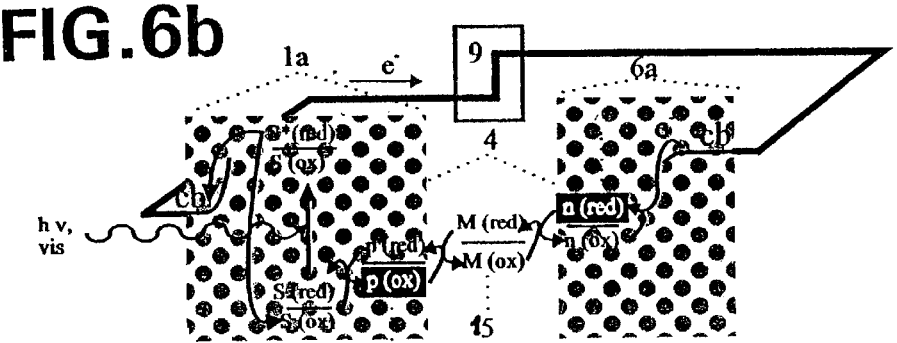
Figure 6C:
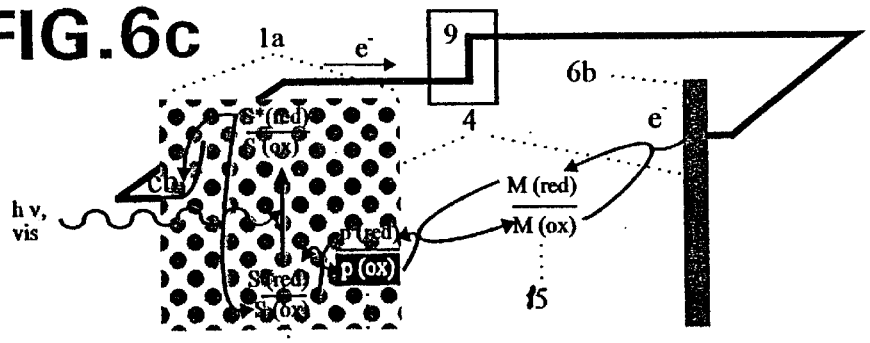
Figure 6D:
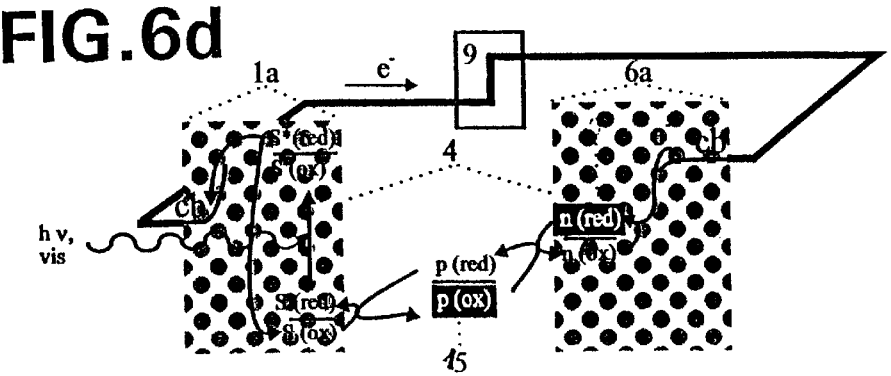
Figure 7A:
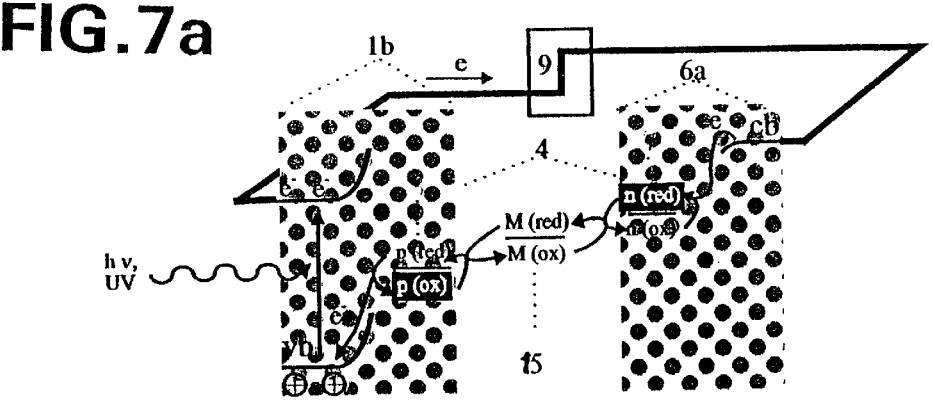
Figure 7B:
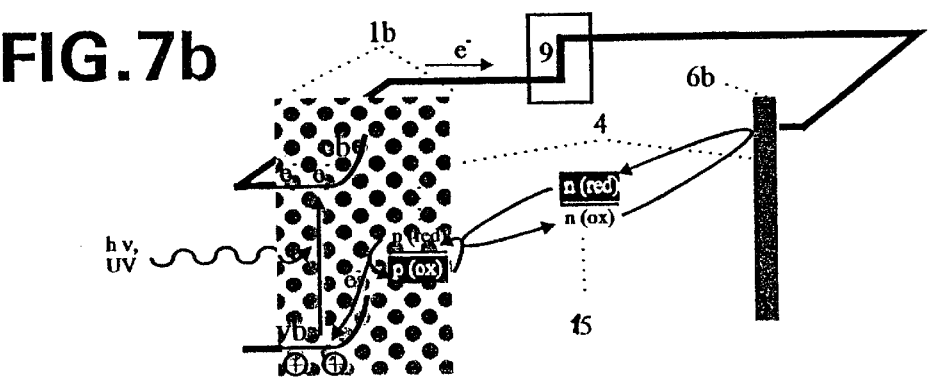
Figure 7C:
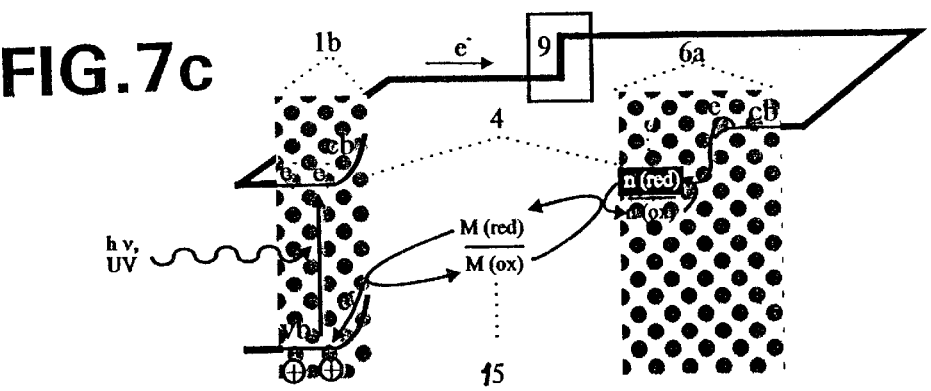
Figure 7D:
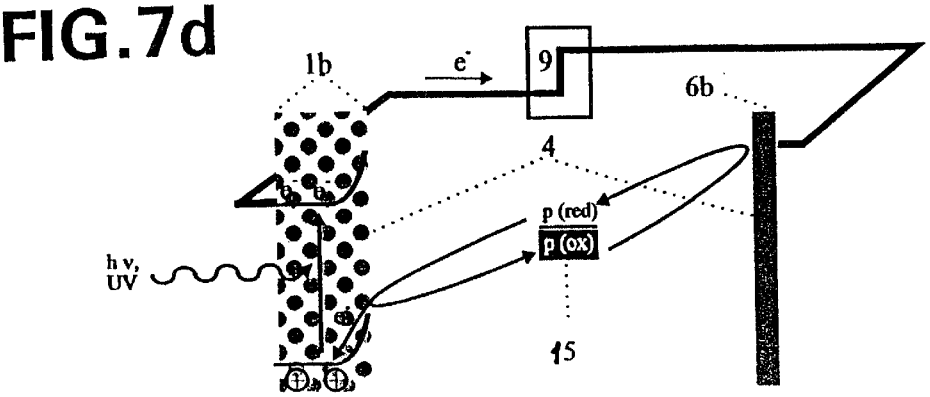
Figure 8A:
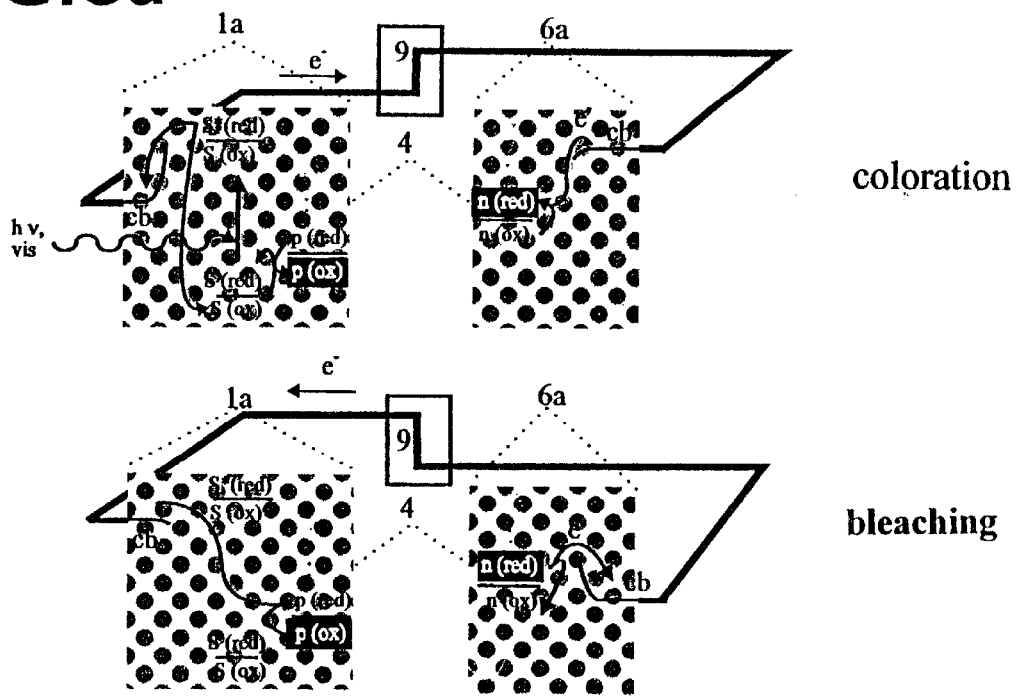
Figure 8B:
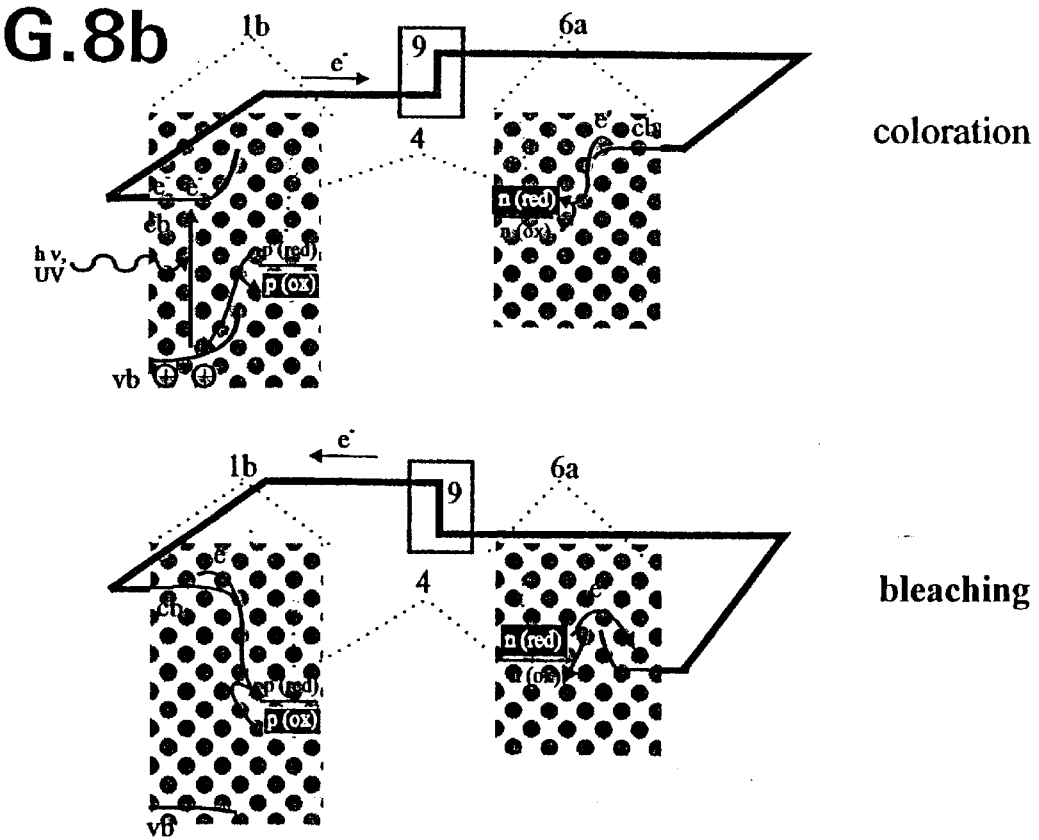
Figure 9:
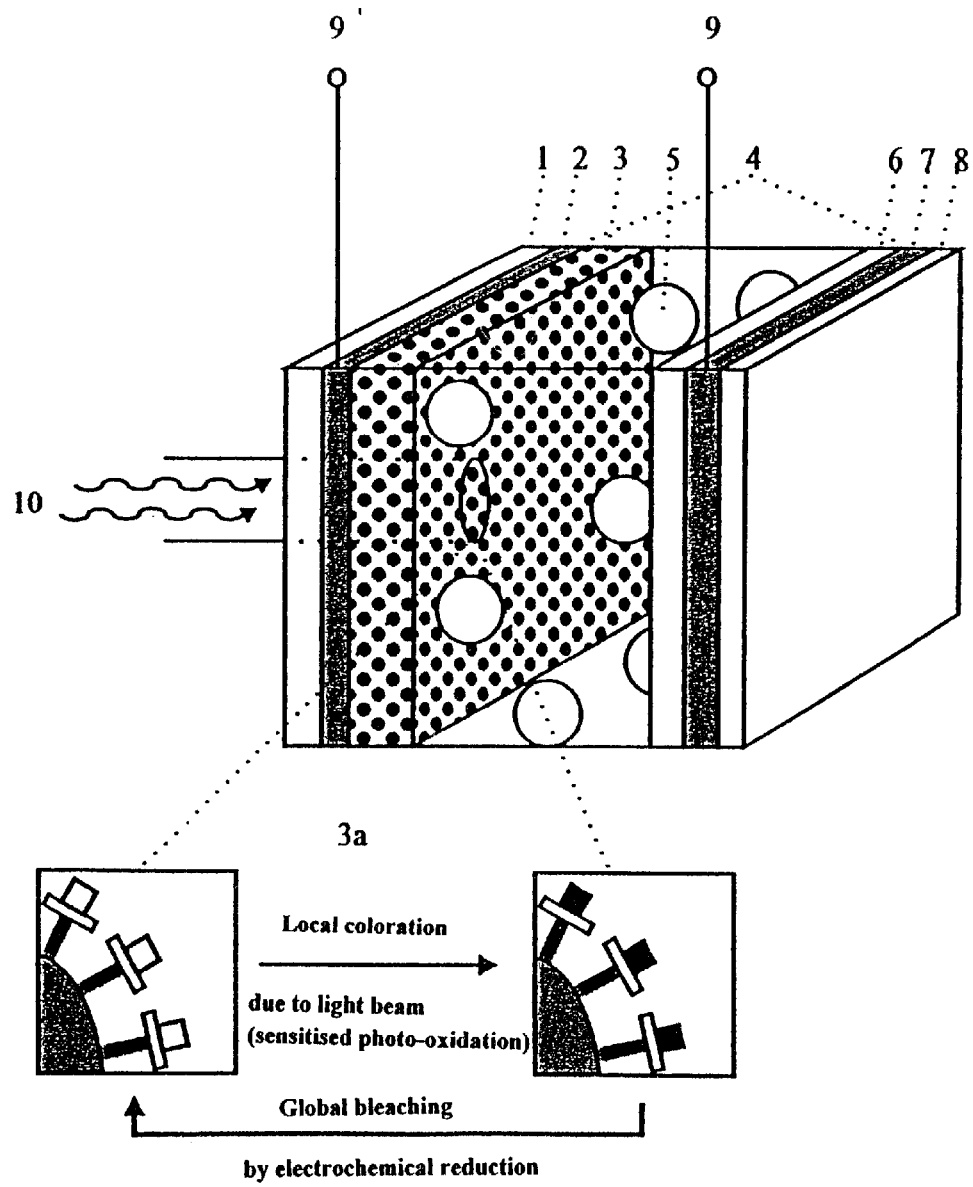
Figure 10:
Figure 10:
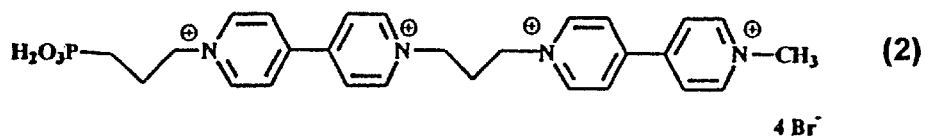
Figure 10:
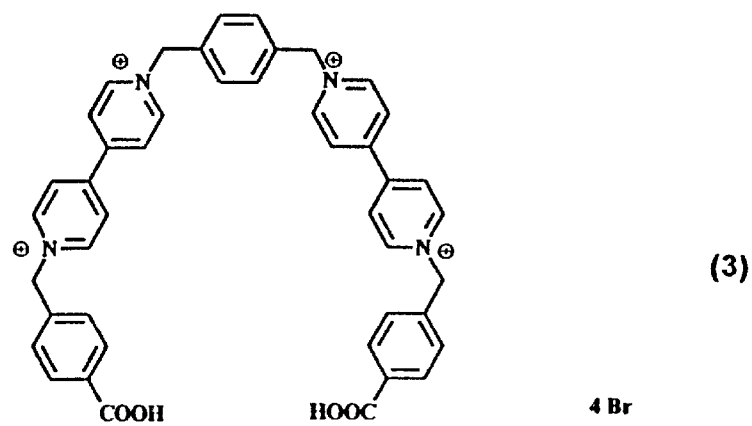
Figure 10:
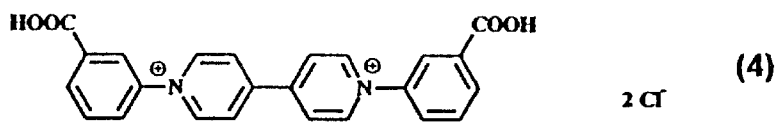
Figure 10:
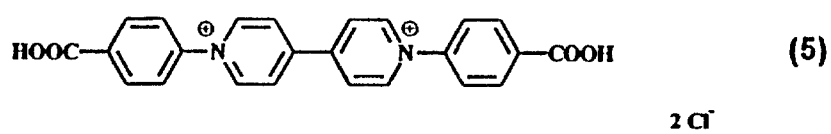
Figure 10:
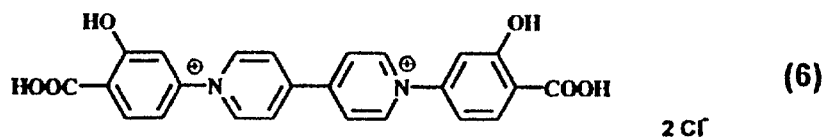
Figure 10:
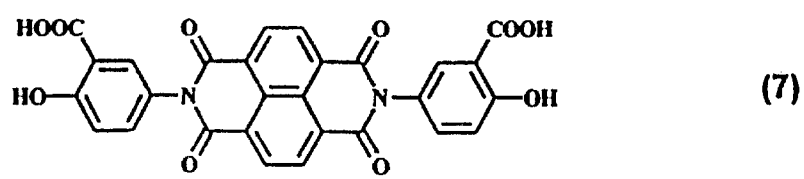

The description which follows, given by way of example, relates to the drawings, in which:

FIG. 1 shows a first variant of a transparent electrochromic device according to the invention, FIG. 2 shows a second variant of a transparent electrochromic device according to the invention, FIG. 3 shows a third variant of a transparent electrochromic device according to the invention, FIG. 4 shows an example of an opaque electrochromic device, FIG. 5 shows the possibility of preparing an opaque electrochromic device of which the cathode is structured, for the reversible data display, FIGS. 6a to 6d show different embodiments of photoelectrochromic devices of the dynamic type, reacting to visible light (D-VIS) according to the invention, FIGS. 7a to 7d show different embodiments of photoelectrochromic devices of the dynamic type, reacting to ultraviolet (D-UV) according to the invention, FIGS. 8a and 8b show different embodiments of photoelectrochromic devices of the persistent type, reacting to visible light (P-VIS) (FIG. 8a) and of the persistent type reacting to ultraviolet (P-UV) (FIG. 8b), FIG. 9 shows a photoelectrochromic device according to the invention for reversible data storage and writing, FIG. 10 shows examples of type n electrochromic molecules formulae, FIG. 11 shows an example of type p electrochromic molecule formulae, and FIG. 12 shows examples of molecules formulae of sensitising agents having type p electrochromophore linked.

The designations of the electrodes as anode and cathode hereinafter refer to their function in the course of the colouring process of the system. In the colouring processes described, the voltages applied are such that the cathode is polarised negatively and the anode positively.

1. Electrochromic systems (FIGS. 1 to 5)

1.1 Transparent electrochromic systems (FIGS. 1 to 3) for the control of light transmission with an external current-voltage source (type I-a).

Such a system comprises two parallel and transparent electrodes, of which the respective supports 1 and 8 are each formed from a conductive plastic or glass plate, e.g. a glass plate covered with tin oxide 2 and 7, preferably doped, or with indium and tin oxide, connected to an external electric circuit by means of contacts 9 (FIGS. 1 to 3).

One of the electrodes (cathode) is constituted of a transparent layer of nanocrystalline semiconductor, e.g. titanium dioxide, of a thickness of between 0.3 and 10 $\mu$m, for example 7 $\mu$m (reference 3 in FIGS. 1 to 3). Its surface comprises a monolayer of adsorbed electrochromophoric molecules of the type of those defined in FIG. 10 (molecules (1) to (7)) and shown in the form of triangles as symbols in FIGS. 1 to 3 (details 3a). These molecules comprise firstly an attachment group, secondly an electrochromophoric group, which does not absorb visible light in the oxidised state (white triangles), but does absorb it in the reduced state (black triangles) (type n electrochromophore), and, thirdly, and possibly, one or more polymerisable or condensible groups. The oxidoreduction potential of the electrochromophore between its two oxidation states must be close to the level or more negative than the level of the conduction band of the semiconductor, for example between 0 and −0.8 V for titanium dioxide. The attachment group must allow for the adsorption of the molecule on the semiconductor. In the case of titanium dioxide, use can be made for the electrochromophoric group of, for example, one or more viologen (4,4'-dialkyl-bipyridinium) or diimide of naphthalene-1,4,5,8-tetracarboxylic acid groups and as the attachment group, for example, carboxylate, salicylate, catecholate, or phosphonate. The polymerisable group, for example vinyl or pyrrole, or the condensible group, for example amine or alcohol, must allow, once adsorption has been effected, for the molecules to link to one another in such a way as to render the layer resistant to desorption.

As shown in FIGS. 1 and 2, the other electrode (anode) is formed of a dense layer 6 (and detail 6a) of transparent material of the polymeric type, reversibly oxidizible, colourless in the reduced state and, respectively, colourless (FIG. 1) or coloured (FIG. 2) in the oxidised state. The quantity of this material must be such that it is possible to extract at least the number of electrons necessary to reduce all the electrochromic groups adsorbed on the cathode. This material is, for example, poly-ferrocyanide iron(II) ("Prussian white")

which, in the oxidised state, forms "Prussian blue", electrodeposited in accordance with the method described by Itaya, Ataka, and Toshima in *J. Am. Chem. Soc.* 1982, 104, 4767.

Alternatively (FIG. 3), the anode is formed from a transparent layer 6 of nanocrystalline semiconductor, analogous to the cathode, and the surface of which bears a monolayer of adsorbed molecules (squares in detail 6a of FIG. 3) which comprise firstly an attachment group, secondly an electrochromophoric group which does not absorb visible light in the reduced state (white squares), but does absorb it in the oxidised state (black squares) (type p electrochromophoric, such as the molecule (8) in FIG. 11), and, thirdly, and possibly, one or more polymerisable or condensible groups. The oxidoreduction potential of the electrochromophore between these two states must be close to the level of the conduction band of the semiconductor, for example between 0 and −0.8 V for titanium dioxide. The electrochromophoric group may also be replaced by an electroactive group, having similar electrochemical properties but of which the two oxidation states are colourless. In the event of both the electrodes being nanocrystalline and carrying electrochromophores, anode and cathode may bear both types n and p of electrochromophore, co-adsorbed, balance reached in any manner by desorption and diffusion across the system in the situation in which the anode and cathode initially bear non-polymerised p and n electrochromes respectively. In this system, in which the two electrodes are identical, with co-adsorption of the two electrochromophores, the p electrochromophore is inert on the cathode and the n electrochromophore is inert on the anode. However, depending on the polarisation, each of the electrodes can be used indifferently as anode or as cathode.

In the general situation in which the p electrochromophoric molecule is present on the anode, the cathode can also be lacking of n electrochromophoric molecules. Its electroactivity is then based on the reversible insertion of small cations into the nanocrystalline semiconductor, for example of lithium in the case of titanium dioxide.

In principle, the number of electrons delivered by the anode after oxidation of all the p electrochromophores or after the maximum reversible insertion of cations must be comparable to the number of electrons consumed by the cathode after the reduction of all the n electrochromophores. In order to adjust the initial state of the system, which must only contain electrochromophores in their colourless state, or in order to correct subsequent deviations of the system which would prevent this colourless state from being restored, a small auxiliary electrode may be provided for in the system. By means of irreversible reduction or oxidation of the solvent or the electrolyte, electrons can be provided to or withdrawn from the electrochromic electrodes in such a way as to correct this deviation.

The space 4 between the two electrodes (FIGS. 1 to 3), being between 10 and 100 μm, for example 30 μm, is filled with a solution formed either from a electrochemically inactive liquid salt, or an electrochemically inactive salt in solution in a solvent, with the possible addition of glass beads 5 in order to ensure the spacing of the electrodes. The liquid salt may be, for example, of the type of N,N'-dialkyl-imidazolium-, N,N'-dialkyl-triazolium-, or N-alkyl-thiazolium trifluorornethane-sulfonate (triflate) or -bis(trifluoromethyl)sulfonylamide (bis-triflylamide), whether carrying or not other alkyl groups. The electrochemically inactive salt in solution in a solvent may be one of the said liquid salts or a solid salt, for example lithium-, tetraalkylammonium-, or 1,3-dialkylimidazolium bistriflylamide, -triflate, -perchlorate, or -hexafluorophosphate. The solvent is a liquid which is stable towards the components of the system, for example acetonitrile, butyronitrile, methoxypropionitrile, glutaronitrile, dimethylsulfoxide, sulfolane, dimethylformamide, dimethylacetamide, N-methyloxazolidinone, dimethyl-tetrahydropyrimidinone (DMPU).

Accordingly, in one embodiment of the invention, an electrochromic system has been prepared in accordance with the structure described, on conductive glass of $SnO_2$, with a cathode made of nanocrystalline titanium dioxide, 7 μm thick, derived by the N-methyl-N'-(3-propylphosphonate)-bipyridinium bromide (molecule (1), FIG. 10), an anode of colourless electrochemically coated poly-ferrocyanide iron (II) and as a solution between the electrodes, lithium bis-triflylamide in a concentration of 0.3 M in glutaronitrile. The cell is sealed by an adhesive bonding agent or a heat-fusible polymer. When a voltage of 1 V is applied between the electrodes, the absorbance of the system at 600 nm passes from 0 to 1.5 in 2 seconds, the appearance changing from transparent colourless to deep blue. The process is reversible in the same interval of time.

In another embodiment, the same system has been prepared with another molecule adsorbed on the cathode: i.e. dimeric viologen provided with a propylphosphonate group (molecule (2) FIG. 10), of which the extinction coefficient at the maximal absorption is double that of viologen 1. With a system such as this, under the same conditions, absorbance at 550 nm passes from 0 to 3 in two seconds, the appearance changing from transparent colourless to deep blue. The process is reversible in the same interval of time.

In another embodiment, the same system has been prepared with another molecule adsorbed on the cathode: i.e. bis-N,N'-[(3-carboxy-4-hydroxyphenyl)-4,4']-bipyridinium bromide 6 (molecule (3) FIG. 10). Such a system, under the same conditions, passes in the same manner from transparent yellowish to deep green.

1.2 Opaque electrochromic systems for controlling light reflection with an external current-voltage source (type I-b, FIG. 4), allowing for data display.

The structure of the system is similar to that of the transparent electrochromic system described under 1.1 (elements 2 and 5 and detail 3a identical to those of FIGS. 1 to 3).

The cathode is formed from an opaque layer of nanocrystalline semiconductor or from a transparent layer 3 of this material, coated on its inside face with an opaque layer 3' of microcrystalline semiconductor, which in both cases functions as a diffusive reflector if the electrochromophore is in its colourless state.

The anode 8 may be made of an electrochemically oxidisible metal plate, e.g. zinc, of which the oxidised form is soluble in the solvent used, and which can be oxidised at a potential close to that of the conduction band of the semiconductor. The solution 4 between the electrodes contains a salt of the cation of the metal constituting the anode, at high concentration.

Alternatively, the anode can be formed from a deposit of Prussian white on conductive plastic or glass, as described under 1.1.

In one embodiment, a system has been prepared of which the cathode is formed of nanocrystalline titanium dioxide 7 μm thick, coated onto the face located inside the electrochromic cell, with a layer of microcrystalline titanium dioxide in opaque and white rutile form. The anode is formed from a zinc plate. The solution between the electrodes contains zinc chloride in a concentration of 0.2 M in 1-ethyl-3-methyl-imidazolium bis-triflylamide. The remainder of the device is identical to the embodiment described under 1.1. with the adsorbed molecules (1) or (2) as defined in FIG. 10. The system passes from a white appearance, by reflection, to a blue appearance, by reflection, in 2 seconds when the voltage applied between the electrodes rises from 0 to 1 V. The process is reversible in the same period of time. If the two electrodes are connected in short-circuit, the system becomes blue, the most thermodynamically stable state, with the zinc oxidoreduction potential being lower than that of the viologen electrochromophoric group under these conditions. Whether the system is in the coloured or colourless state, this state will persist for several hours when the circuit is open.

In one of the two embodiments 1.1 or 1.2, the electrode (conductive glass and semiconductor layer) may be engraved in such a way as to determine conductive segments separated by insulating strips. Lateral electrical connections allow for each of the segments to be controlled independently. It is therefore possible to prepare a device which will allow for the display of symbols, digits, or letters (FIG. 5).

2. Photoelectrochromic systems (FIGS. 6 to 9)

The device features the property of changing its colour under the effect of light.

The system comprise two parallel transparent electrodes, the support of which is constituted of a plate of conductive plastic or glass, for example a glass plate coated with an indium and tin oxide or doped tin oxide.

Such a system comprises, as an internal source of current-voltage, a photovoltaic electrode (references 1a and 1b in FIGS. 6 to 8, and references 1, 2, 3 in FIG. 9) (photoanode). This electrode, which replaces the anode described under 1.1, is prepared as for the cathode, by coating a layer of nanocrystalline semiconductor on a layer of conductive plastic or glass. Under lighting, the photoanode produces electrons at the potential of the conduction band cb (FIGS. 6 to 8) of the semi-conductor. These electrons are conducted by the external electric circuit 9, with or without the provision of additional voltage, as far as the cathode (references 6a and 6b, FIGS. 6 to 8, and references 6, 7, 8 in FIG. 9), in which, via the conduction band cb of the semiconductor, they reduce the adsorbed type n electrochromic molecules. The electrons are returned at the photoanode by oxidation of a reversible oxidisible molecule (donor 15, FIGS. 6 and 7), possibly a type p electrochromophore.

On the one hand, a distinction may be made between two types of systems which lead to colour under light effect:

D. Dynamic (FIGS. 6 and 7): the two redox systems, i.e. the adsorbed n electrochrome and the donor are in direct or indirect electrochemical contact. In the case of a direct contact, the donor, in solution, may be either a non-electrochromophoric electrochemical mediator, or an p electrochromophore. In the case of an indirect contact, the p electrochromophore is fixed to the anode by an adsorbable group and the electrochemical contact is provided either by a non-electrochromophoric mediator in solution, or by a conductive polymer. The electron transfer, direct or indirect, oxidises the n electrochromophore and reduces the possible p electrochromophore, a process opposite to that engendered by light. The competition between these two processes results in the stationary dynamic state of the system, characterised by a certain proportion of the electro-chromophore (s) in their coloured state. The global coloration then adapts automatically and very rapidly to the lighting intensity. The prior regulating which determines the response of the system is performed by adjusting parameters which control the competition between the two opposed processes: concentration of the mediator or of the p electrochromophore in solution, diffusion of these species (by the solvent viscosity, for example), distance between the electrodes, photovoltaic output of the photo-anode. The user can control the response by means of the external electric circuit.

P. Persistent (FIGS. 8 and 9): the two redox systems, i.e. the adsorbed n electrochromophore and the donor are not in electrochemical contact. It is possible either to fix the donor to the cathode by an adsorbable group, or, if this donor is in solution, to prevent its diffusion by a membrane between the electrodes. This type of system does not adapt to the instantaneous lighting intensity, but changes colour as a function of the quantity of photons received since the start of the lighting, until a maximum (saturation) has been reached, which then persists even if the intensity subsequently drops. The system can be returned to the colourless state (deletion) by the action of an external current-voltage source which reverts the electrochromophore(s) to their initial state.

On the other hand, it is possible to define two types of anode photovoltaic activity:

UV. The semiconductor of the anode is excited directly by the ultraviolet light (hv UV, FIGS. 7 and 8b) (excitation of the band gap). The donor is in this case oxidised via the holes engendered in the valency band of the semiconductor.

VIS. The semiconductor is sensitised to visible light (hv VIS, FIGS. 6 and 8a) by adsorption of a dye. When the photovoltaic anode is lit, the dye carried on the anode injects electrons into the conduction band of the semiconductor. The dye must be chosen such that, in the state when excited by visible light, it is capable of injecting an electron into this conduction band. Use may be made, for example, of a ruthenium complex comprising of aromatic ligands of the pyridine or poly-pyridine type, provided with an attachment group which allows adsorption, e.g. phosphonate, carboxylate, salicylate, or catecholate.

Moreover, in order to ensure the flow of electrons from the photoanode towards the cathode, and to optimise the system, it may be necessary to equip the external electric circuit with a current-voltage source or with a diode.

This invention accordingly relates to all the photoelectrochromic systems realised, by combining in every possible manner the D and P principles with the UV and VIS principles.

2.1. Dynamic photoelectrochromic systems for self-adapting filters or "intelligent" glazing (II-B)

2.1.1 Systems reacting to visible light.

2.1.1.1 Anode with dye, cathode with electrochromophore (D-VIS, donor in solution, FIGS. 6a and 6d).

The cathode is prepared as described under 1.1. The anode likewise comprises a layer of nanocrystalline titanium dioxide, but of a roughness factor 10 to 30 times smaller than that of the cathode, in such a way that its colour is not easily perceptible and accordingly does not lead to a the permanent coloration of the system. For example, for a cathode of a roughness factor equal to 1000, an anode will be prepared of which the roughness factor will be 30 to 100. If the roughness factor varies in linear fashion with the thickness, then, with a cathode of 10 $\mu$m thickness, for example, an anode will correspond of 0.3 to 1 $\mu$m in thickness.

Because the quantity of the dye S of the anode is much less than the quantity of the n electrochrome of the cathode, each molecule of the dye must carry out several electron injection cycles in order for the whole of the electrochrome of the cathode to be reduced. An electrochemical mediator 15 in solution must be present, in order to be capable of reducing the oxidised dye $S^+$ after each electron injection. Its oxidoreduction potential must therefore be less than that of the dye. In order for the system to revert to its initial state, colourless when the lighting ceases, the electrochemical mediator in oxidised form must be capable of oxidising the reduced electrochrome. This process must be slow enough, however, that, under lighting, the stationary state reached by the system is characterised by a high proportion of reduced electrochrome. One practical method of adjusting the kinetics of the process is to vary the viscosity of the solution 4. The liquid salts are solvents, well-suited to do this.

In a variant embodiment, use may be made of a p electrochromophore as the electrochemical mediator (FIG. 6d).

In an example of realisation, the photovoltaic anode, formed from a layer of nanocrystalline titanium dioxide of 0.3 μm, carries as the adsorbed dye a ruthenium complex, e.g. cis-dithicyanato-bis-(2,2'-bipyridyl-4,4'-dicarboxylato)-ruthenium(II) or 4,4'4"-trimethyl-terpyridine-phosphonatoterpyridine ruthenium(II), the cathode is formed from a layer of nanocrystalline titanium dioxide of 7 μm, and carries the adsorbed electrochromophoric molecules, such as molecule (1) as defined in FIG. 10, and the solution between the electrodes comprises a salt of a cobalt complex, e.g. tris-phenanthroline-cobalt(II) trifluoromethanesulfonate and a lithium salt, for example bis-trifylamide, in a liquid salt described under 1.1, e.g. 1-ethyl-2-methyl-imidazolium bis-triflylamide. Under simulated sunlight lighting (AM 1.5), the system becomes blue and adsorbs more than 90% of the light at 600 nm. When the lighting ceases, the system reverts to being colourless.

2.1.1.2. Anode with p electrochromophoric donor linked to the dye, cathode with n electrochromophore (D-VIS, FIG. 6b).

Such a system is constituted as under 2.1.1.1, with the exception of the fact that the roughness factor of the two electrodes 1a and 6a is in principle identical, being between 100 and 1500, 700 for example, and that the dye S adsorbed on the cathode carries an p electrochromophoric group linked to this dye by a covalent bond.

When the photoanode is lit by visible light (hv VIS), the dye carried on the anode injects electrons into the conducting band of the semiconductor, and immediately oxidises the p electrochromophoric group, which becomes coloured. The electrons are conducted by the electric circuit as far as the cathode, where, by means of the conduction band of the semiconductor, they reduce the adsorbed electrochromic molecule.

In principle, the number of electrons delivered by the anode after the oxidation of all the p electrochromophores must be comparable to the number of electrons consumed by the cathode after reduction of all the n electrochromophores.

Such a system is naturally coloured in both the lit and the non-lit states. In the absence of lighting, its coloration results from the light absorption by the dye; under lighting, absorptions of the oxidised p electrochromophores and reduced n electrochromophores are added.

The solution between the electrodes is formed by an electrochemical mediator of which the oxidoreduction potential is midway between that of the p electrochromophore and that of the n electrochromophore. Its concentration, and the proportions of the oxidised and reduced forms, in principle equal, are adjusted in such a way that the system reverts to the initial colourless state when the lighting ceases. This process must, however, be sufficiently slow that, under lighting, the stationary state reached by the system is characterised by a high proportion of the reduced n electrochrome and the oxidised p electrochrome. One practical way of adjusting the kinetics of the process consists of varying the viscosity of the solution. The liquid salts are solvents, well-suited to do this.

In one embodiment, the photovoltaic anode is formed from a nanocrystalline titanium dioxide layer of 7 μm, which carries, as the adsorbed molecule (molecules (9) or (10) as defined in FIG. 12) a ruthenium complex, e.g. bis-terpyridine ruthenium, provided with an attachment group, e.g. phosphonate, and linked to an p electrochromophoric group, e.g. (bis(4'4"-methoxyphenyl)amino-4-phenyl (for the molecule (9)) or (bis(4',4"-methoxyphenyl)amino-4-phenoxymethyl (for the molecule 10)). The cathode, formed from a nanocrystalline titanium dioxide layer of 7 μm, carries a monolayer of adsorbed n electrochromophoric molecules, for example molecule (1) as defined in FIG. 10. The solution between the electrodes comprises of a cobalt complex salt in form of cobalt(II) and cobalt(III), e.g. tris-phenanthroline-cobalt trifluoromethanesulfonate, and a lithium salt, e.g. bis-trifylamide, in a liquid salt described under 1.1, e.g. 1-ethyl-2-methyl-imidazolium bis-triflylamide. Under lighting by simulated sunlight (AM 1.5), the system passes from orange to green, and absorbs more than 90% of the light from 600 to 750 nm. When the lighting ceases, the system reverts to orange and absorption of 600 to 750 nm reverts to less than 10%.

2.1.1.3. Anode with co-adsorbed electrochromophore (D-VIS, FIG. 6b)

Such a system is constituted as under 2.1.1.2, with the exception of the fact that the p electrochromophoric group is not linked by a covalent bond to the dye, but constitutes a distinct molecule, likewise carrying an attachment group, and co-adsorbed with the dye on the photoanode. The process of oxidation of the p electrochromophore by the dye is not intramolecular, as under 2.1.1.2, but intermolecular. If the dye is capable of oxidising several co-adsorbed p electrochromophoric molecules in succession, it is possible to adsorb more electrochromophoric molecules than dye, which limits the coloration of the non-lit system.

The solution between the electrodes is identical to that described under 2.1.1.1.

In one embodiment, the photovoltaic anode is formed of a nanocrystalline titanium dioxide layer of 7 μm, which carries as adsorbed molecules primarily a ruthenium complex, e.g. bis-terpyridine ruthenium provided with an attachment group, e.g. phosphonate, and secondly an p electrochromophoric molecule, e.g. molecule (8) as defined in FIG. 11. The surface area concentration of the electrochromophoric molecule is twice as great as that of the dye, a proportion obtained by sensitising the electrode by immersion in a solution of the two molecules in a ratio of concentrations of one dye to two electrochromophores. The cathode, formed from a nanocrystalline titanium dioxide layer of 7 μm, carries a monolayer of adsorbed n electrochromophoric molecules, e.g. molecule (1) defined in FIG. 10. The solution between the electrodes is identical to that described under 2.1.1.2. Under simulated sunlight lighting (AM 1.5), the system changes from very light orange to deep blue and absorbs more than 90% of the light from 600 to 750 nm. When the lighting ceases, the system reverts to its initial state and the absorption of 600 to 750 nm reverts to less than 10%.

2.1.1.4 Anode with p electrochromophoric donor linked to the dye, cathode without electrochromophore (D-VIS FIG. 6c).

The devices described under 2.1.1.2 and 2.1.1.3 may also be realised with a cathode 6b of conductive plastic or glass (transparent embodiment) or metal (opaque embodiment) which does not carry any semiconductor layer nor adsorbed molecules. The system can therefore contain, as electrochemical mediator, a type p electrochromophore in solution.

2.1.2 Systems reacting to ultraviolet 2.1.2.1. p Electrochromophore adsorbed at the anode, n electrochromophore adsorbed at the cathode (D-UV, FIG. 7a)

In order to obtain a system which reacts to ultraviolet, it is appropriate to adsorb on the photoanode 1b a monolayer of electrochromophoric molecules, colourless in the reduced state and coloured in the oxidised state (p electrochromophore), and on the cathode 6a, a monolayer of n electrochromophoric molecules. The roughness factor of the two electrodes is in principle identical, being between 100 and 1500, for example 700. In principle, the number of electrons delivered by the anode after oxidation of all the electrochromophores p should be comparable to the number of electrons consumed by the cathode after reduction of all the n electrochromophores.

When the photoanode is lit by a close ultraviolet ray (hv UV) (350–420 nm), the excitation of the electrons of the valency band of the semiconductor in the conduction band engenders in this valency band a number of "holes" of a potential of about 3 V, which oxidise the p electrochromophore, which becomes coloured. The electrons are conducted by the electric circuit 9 as far as the cathode, where, via the conduction band of the semiconductor, they reduce the adsorbed electrochromic molecule.

The solution between the electrodes is formed of an electrochemical mediator 15, of which the oxidoreduction potential is midway between that of the p electrochromophore and that of the n electrochromophore. Its concentration and the proportions of the oxidised and reduced forms, in principal equal, are adjusted in such a way that the system reverts to the initial state, colourless, when the lighting ceases. This process must, however, be sufficiently slow that, under lighting, the stationary state reached by the system is characterised by a high proportion of the reduced n electrochrome and the oxidised p electrochrome. One practical method of adjusting the kinetics of the process is to vary the solution viscosity. The liquid salts are solvents well-suited to do this.

In one embodiment, the photovoltaic anode is formed from a nanocrystalline titanium dioxide layer of 7 μm, which carries as adsorbed p electrochromophoric molecule a tri-arylamine provided with an attachment group, e.g. sodium (bis-(4',4"-methoxyphenyl)amino-4-phenoxy)-3-propylphosphonate (molecule (8) as defined in FIG. 11). The cathode, formed from a nanocrystalline titanium dioxide layer of 7 μm, carries the adsorbed n electrochromophore, e.g. molecule (1) as defined in FIG. 10. The solution between the electrodes is identical to that described under 2.1.1.2.

2.1.2.2 Anode with p electrochromophoric donor, cathode without electrochromophore (D-UV, FIG. 7b)

The device described under 2.1.2.1 can also be realised with a cathode 6b of conductive plastic or glass (transparent embodiment) or of metal (opaque embodiment) which does not carry any semiconductor layer nor adsorbed molecules. The system can therefore contain, as electrochemical mediator 15, a type n electrochromophore in solution.

2.1.2.3 Anode without electrochromophoric donor, cathode with n electrochromophore (D-UV, FIG. 7c)

The device described under 2.1.2.1 can also be realised with an anode 1b of which the semiconductor does not carry any layer of adsorbed electrochromophoric molecules. The holes in the valency band of the semiconductor therefore oxidise directly the electrochemical mediator 15 in solution, which oxidises the reduced n electrochromic compound of the cathode 6a.

2.1.2.4 Anode without electrochromophoric donor, cathode without electrochromophore, electrochemical mediator p electrochromophore in solution (D-UV, FIG. 7d)

The device described under 2.1.2.3 can also be realised with a cathode 1b of conductive plastic or glass (transparent embodiment) or of metal (opaque embodiment), which does not carry any layer of semiconductor nor adsorbed molecules. The electrochemical mediator 15 is therefore an p electrochromophore.

2.2 Persistent photoelectrochromic systems for reversible data storage (III-A) (FIGS. 8 and 9)

2.2.1 Systems reacting to visible light (P-VIS, FIGS. 8a and 9)

The device features the property of changing its colour under the effect of light when a voltage is applied to it. Whatever the lighting may be, it reverts to its initial state when the voltage is inverted.

The system comprises two transparent or opaque, parallel electrodes, as described under 2.1, connected by an electric circuit provided with a current-voltage source 9.

2.2.1.1 Transparent systems The anode 1a (FIG. 8a) or 1,2,3 (FIG. 9), with adsorbed molecules, is formed in a manner analogous to that described under 2.1.1.2 (adsorbed molecules of type (9) and (10) as defined in FIG. 12, and represented in FIG. 9, detail 3a, by a rectangle (chromophore) and a square (p electrochromophore)) or that as described under 2.1.1.3 (co-adsorption of the adsorbed molecules of type (8) defined in FIG. 11 and a ruthenium complex provided with an attachment group). In addition to these molecules, it may be necessary to co-adsorb an electrochemically inactive molecule which isolates the adsorbed p electrochromophores, from one to another, in such a way as to avoid the electron transfer between these electrochromophores, which would prevent the local confinement of the information.

The cathode is formed as described under 1.1, with the exception of the fact that it is not coated with a molecular monolayer. The solution between the electrodes 4 contains a salt of an ion which is capable of being reversibly inserted within the semiconductor, dissolved in a solvent such as described under 1.1. When a light beam 10 (FIG. 9), for example a laser, reaches an area of the anode, the dye of the site injects electrons into the conduction band of the semiconductor, and the oxidised dye immediately oxidises the p electrochromophoric group which is bonded to it. Under the effect of the electrical voltage applied, the electron is extracted from the anode and conducted to the cathode, where it allows for the inserting of a cation.

In one variant, the cathode is prepared as described under 1.1, with the exception of the fact that it is coated with a molecular monolayer of an n electrochromophore (FIG. 8a) or of an adsorbable electroactive molecule, of which the two oxidation states are colourless (non n electrochromophoric element). In this case, the electron which is extracted from the anode and conducted to the cathode allows for the reduction of the electroactive molecule, whether it is electrochromophoric or not.

In another variant (FIG. 9), the cathode is formed from a dense layer of transparent material 6, of the polymeric and reversibly oxidisable type, colourless in both its oxidation states. In this case, the electron extracted from the anode and conducted to the cathode allows for the reduction of the polymer.

The local coloration engendered by the oxidation of the electrochromophoric molecule at the point of lighting may be deleted by cancelling the voltage between the electrodes, and thus allowing a short-circuit to occur, even by applying an opposed voltage.

In one embodiment, the anode is formed from a nanocrystalline titanium dioxide layer of 7 µm, which carries as adsorbed molecule (molecule (9) or (10), FIG. 12), a ruthenium complex, e.g. bis-terpyridine ruthenium, provided with an attachment group, e.g. phosphonate, and bonded to an p electrochromophoric group, e.g. (bis(4',4"-methoxyphenyl) amino-4 phenyl (for the molecule (9)) or (bis(4',4"-methoxyphenyl)amino-4 phenoxymethyl (for the molecule (10)). The cathode is formed from a nanocrystalline titanium dioxide layer of 7 µm. The solution between the electrodes comprises a lithium salt, e.g. bis-triflylamide in a liquid salt as described under 1.1, e.g. 1-ethyl-2-methyl-imidazolium bis-triflylamide. When the system is subjected to a voltage of 0.5 V, in such a way that the anode is charged positively and the cathode negatively, localised lighting for one minute by white light of the intensity of 1 sun (AM 1.5) produces a change of colour from orange to green exclusively at the lit portion area. The system can be maintained in an open circuit in this state for several hours. It can be reverted to its initial state by applying a voltage of −0.5 V.

2.2.1.2 Opaque systems

The system is identical to the transparent photoelectrochromic system as described under 2.2.1, except with regard to the anode. This is formed from an opaque layer of nanocrystalline semiconductor.

In one embodiment, the anode is formed from nanocrystalline titanium dioxide of 7 µm in thickness, coated onto the face located inside of the cell with a microcrystalline titanium dioxide layer in opaque and white rutile form, which carries as the adsorbed molecule (molecules (9) or (10) FIG. 12). The remainder of the device is identical to the embodiment described under 2.2.1. This system is better compatible with the presence of an n electrochromophore on the cathode, due to the fact that this is masked entirely by the opaque anode and that its possible coloration does not interfere with a data reading and storage process taking place on the anode.

2.2.2 Systems reacting to ultraviolet (P-UV, FIG. 8b)

In the situation in which the cathode does not carry an adsorbed dye, but solely an p electrochromorphic compound, the system reacts to ultraviolet in the same manner as the system described under 2.2.1 reacts to visible light.

What is claimed is:

1. A type n electrochromophoric compound, characterised in that it is formed of one or more 4.4'dialkvl-bipyridinium viologen groups linked by one or more alkyl chains which may include one or more phenylene groups and terminated by a phosphonate, salicylate, or catecholate group.

2. A type n electrochromophoric compound according to claim 1, characterised in that it further comprises a pyrrole, thiophene, vinyl, alcohol, or amine group.

3. A type n electrochromophoric compound, characterised in that it is formed of one or more diimide of naphthalene-1, 4,5,8-tetracarboxylic acid groups linked by one or more alkyl chains which may include one or more phenylene groups and terminated by a phosphonate, salicylate, or catecholate group.

4. A type n electrochromophoric compound according to claim 3, characterised in that it further comprises a pyrrole, thiophene, vinyl, alcohol, or amine group.

5. A type p electrochromophoric compound, characterised in that it is formed of one or more triarylamine groups linked by one or more alkyl chains which may include one or more phenylene groups and terminated by a phosphonate, salicylate, or catecholate group.

6. A type p electrochromophoric compound according to claim 5, characterised in that it further comprises a pyrrole, thiophene, vinyl, alcohol, or amine group.

7. A sensitising agent compound to which are linked one or more type p electrochromophoric groups, characterised in that the sensitising agent is a ruthenium complex comprising polypyridine ligands of which at least one possesses one or more phosphonate, carboxylate, salicylate, or catecholate groups and at least one or more triarylamine groups.

8. A sensitising agent compound according to claim 7, characterised in that it further comprises a pyrrole, thiophene, vinyl, alcohol, or amine group.

* * * * *